US010180321B2

(12) United States Patent
Allocco et al.

(10) Patent No.: US 10,180,321 B2
(45) Date of Patent: Jan. 15, 2019

(54) CALCULATING DURATION TIME IN A CONFINED SPACE

(71) Applicant: 3VR Security, Inc., San Francisco, CA (US)

(72) Inventors: Christopher Allocco, San Francisco, CA (US); Derrick Low, San Francisco, CA (US); Narasimha Paila, Dublin, CA (US); Jithendra Paruchuri, Daly City, CA (US); Ali Zandifar, San Francisco, CA (US)

(73) Assignee: 3VR SECURITY, INC., San Francisco, CA (US)

( * ) Notice: Subject to any disclaimer, the term of this patent is extended or adjusted under 35 U.S.C. 154(b) by 932 days.

(21) Appl. No.: 14/292,832

(22) Filed: May 31, 2014

(65) Prior Publication Data

US 2015/0345942 A1    Dec. 3, 2015

(51) Int. Cl.
*G01C 11/04* (2006.01)
*G06K 9/00* (2006.01)
*G06Q 30/02* (2012.01)
*G06Q 10/02* (2012.01)
*G06Q 50/00* (2012.01)

(52) U.S. Cl.
CPC .......... *G01C 11/04* (2013.01); *G06K 9/00711* (2013.01); *G06K 9/00771* (2013.01); *G06Q 10/02* (2013.01); *G06Q 30/0201* (2013.01); *G06Q 30/0255* (2013.01); *G06Q 30/0277* (2013.01); *G06Q 50/01* (2013.01)

(58) Field of Classification Search
CPC .. G06Q 10/1091; G06Q 10/06; G06Q 10/105; G06Q 40/125; G06Q 40/12

USPC ......................................................... 705/32
See application file for complete search history.

(56) References Cited

U.S. PATENT DOCUMENTS

| 8,429,088 B2* | 4/2013 | Kaplan | G06Q 30/06 705/1.1 |
| 2011/0099046 A1* | 4/2011 | Weiss | G06Q 10/00 705/7.31 |
| 2014/0122483 A1* | 5/2014 | Zhang | G06Q 10/10 707/737 |

OTHER PUBLICATIONS

Nam, Yunyoung; Rho, Seungmin; Park, Jong Hyuk. Inference topology of distributed camera networks with multiple cameras. Multimedia Tools and Applications; Dordrecht vol. 67, Iss. 1, Nov. 2013.*

* cited by examiner

*Primary Examiner* — Florian M Zeender
(74) *Attorney, Agent, or Firm* — Hickman Palermo Becker Bingham LLP (57) ABSTRACT

Techniques are provided for calculating an average time people spend at a particular location, such as a store. A plurality of entrance times is identified, where each entrance time corresponds to when one or more objects entered the particular location. A plurality of exit times is also identified, where each exit time corresponds to when one or more objects exited the particular location. An average entrance time is determined based on the plurality of entrance times. An average exit time is determined based on the plurality of exit times. An average time people spend at the particular location is determined based on a difference between the average exit time and the average entrance time.

22 Claims, 3 Drawing Sheets

CALCULATING DURATION TIME IN A CONFINED SPACE

FIELD OF THE DISCLOSURE

The present disclosure relates to calculating an average duration time for object in a confined space.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for calculating an average time objects spend in a particular location. In one technique, an entrance time is determined for each object (e.g., a person) that enters a location and the entrance time is associated with the object. An exit time is later determined for each object. For each individual, a staying duration is determined that reflects a difference between the exit time for that object and the entrance time for that individual. In the shopping context, the staying duration is referred to as "shopping time." An average staying duration is determined based on all the objects that have an associated staying duration.

In another technique, objects are not tracked. Instead, multiple entrance times are determined, one for each object that enters a certain location. Also, multiple exit times are determined, one for each object that exits the location. An average entrance time is determined based on all the entrance times. An average exit time is determined based on all the exit times. An average staying duration is determined by comparing the average exit time with the average entrance time.

Reference herein to "average staying duration," "average shopping time," or "average time" also includes median staying duration, median shopping time, or median time, unless otherwise indicated. Selecting a median shopping time, for example, reduces the effect that outliers (e.g., all day shoppers) would have in a calculated average shopping time.

While the following description and examples are primarily in the context of shopping at a store, embodiments are not limited to the shopping context. For example, average staying duration may be calculated for people at a certain place in a museum or zoo. As another example, the average staying duration of one or more animals within a certain geographical area may be calculated.

As used herein, a "store" is any physical location where customers can enter and purchase one or more items, such as food, clothing, electronics, toys, office/school supplies, plants, fuel, etc. A store may include an enclosed building with a roof and walls or may be an open air market that has no walls or no walls or roof. A store may be a retail store or a wholesale store.

Tracking Objects

In an embodiment, objects are tracked and their individual staying durations are determined. An object may be tracked in one of multiple ways. For example, one or more video cameras may be directed to one or more entrances of a store and generate video data of people entering the store. Facial recognition software is used to detect and recognize faces of the people. The same or different set of one or more cameras is directed to an exit of the store and generates video data of people exiting the store. The facial recognition software is used to detect and recognize faces of the people exiting the store and match those faces with the faces detected of the people entering the store. If there is a match, then a shopping duration is determined for the person corresponding to the match.

The facial recognition and matching may be performed "online"; that is, while the video data is being generated or while the store is open. Alternatively, the facial recognition and matching may be performed "offline" or after the store closes.

As another example of how objects may be tracked is each individual entering/swiping a card (e.g., a credit card or a card issued by the store) into a card reader upon entry and entering/swiping the card into the same or different card reader upon exit. Previously-issued cards could be used in the context of access controlled office spaces.

As another example, exit times of individuals are tracked through their respective credit card payments rather than calculating when the individuals exit the doors of a store.

As another example, each individual receives a RFID tag upon entering the store. An RFID tag may be activated upon being issued to an individual. The RFID tag sends a signal to one or more RFID receivers. When no RFID receivers receive the signal from the RFID tag, then it is presumed that the individual has exited the store. Alternatively, the RFID tag may send a signal to an RFID receiver when the RFID tag reaches an exit, indicating that the individual has left the store.

In an embodiment, when a facial recognition technique is used, employees of a store are pre-registered so that employees' entrances and exits from the store are not considered when determined the average staying duration. Some employees may enter and exit the store frequently throughout the day, which might cause the average shopping time to decrease if those employees were considered. Additionally or alternatively, some employees may stay within the store all day or for a relatively long period of time that is longer than the average shopping time, which might cause the average shopping time to decrease if those employees were considered. Some stores, however, use different doors for employees to enter and exit. In such circumstances, facial recognition may not be needed for those employees. Additionally, when employees are working during their respective working hours, they generally do not leave. Thus, the entrance and exit times will not be significantly affected.

Figure 1:
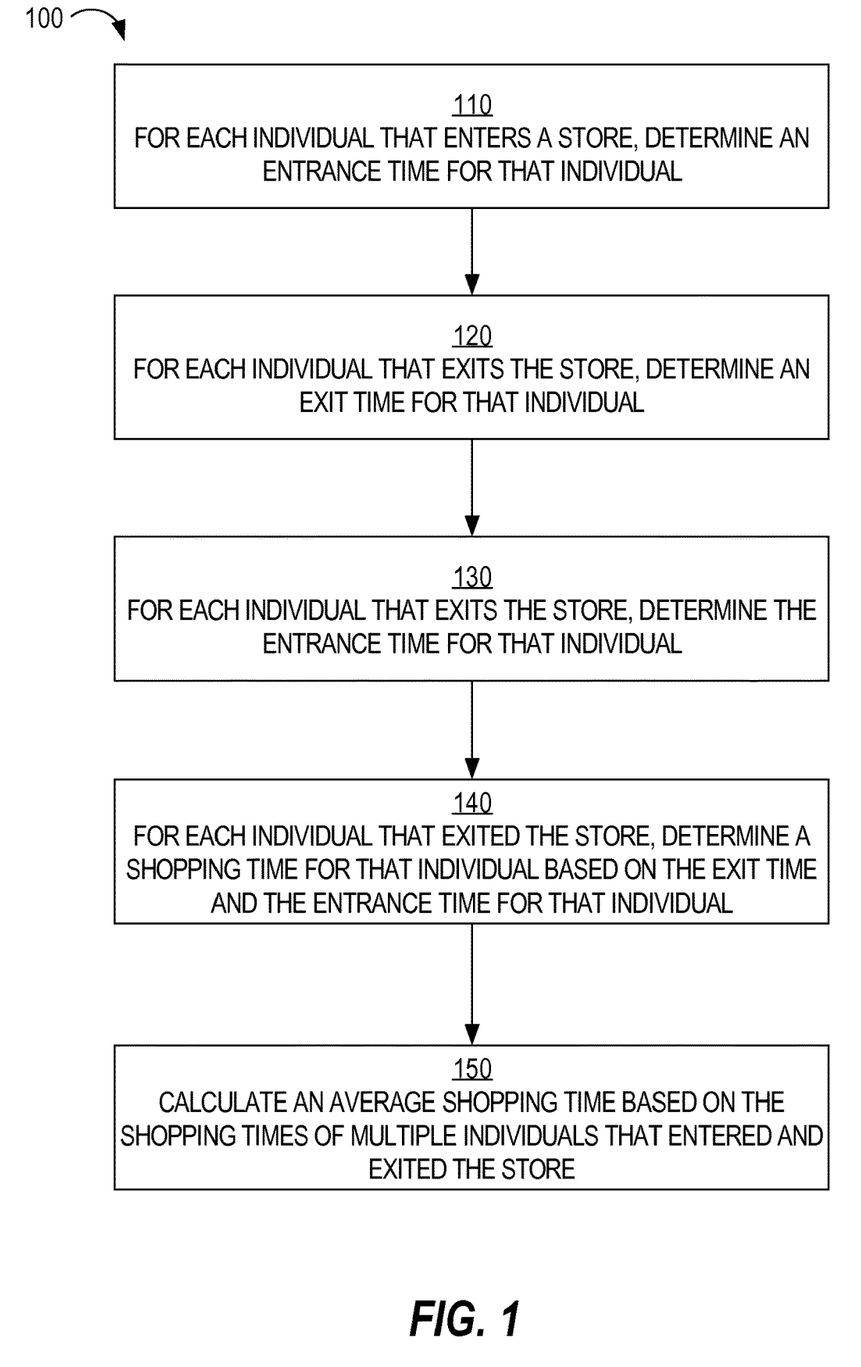
FIG. 1 is a flow diagram that depicts a first process for calculating an average shopping time, in an embodiment.

FIG. 1 is a flow diagram that depicts a process 100 for calculating an average shopping time, in an embodiment.

At block 110, for each individual that enters a store, an entrance time is determined.

At block 120, for each individual that exits the store, an exit time is determined.

At block 130, for each individual that exits the store, the entrance time of that individual is identified. If video surveillance is used to track individuals, then block 130 may comprise determining a match for a face of an individual that exited the store with a face of an individual that entered the store. If no match is determined (e.g., within a certain degree of confidence), then the exit time of the individual that exited the store may be discarded. If a match is found (e.g., within a certain degree of confidence), then the entrance time associated with that individual is retrieved.

In an embodiment, an exit time-entrance time pair is excluded if the match between the "entrance face" and the "exit face" is below a confidence threshold. In other words, if the two faces have a high probability of matching, then the respective times are kept; other times are excluded. The times that are kept may be considered a representative subsample of the actual shopping population. In a related embodiment, the confidence threshold is adjusted based on the number of matches. For example, if the number of matches is low (e.g., less than 100) or the match rate is low (e.g., a 54% match rate), then the confidence threshold may be lowered so that more matches may be identified. Conversely, if the number of matches is high or the match rate is high (e.g., a 99% match rate), then the confidence threshold may be increased in order to get more accurate matches without sacrificing too much on accuracy and margin of error.

At block 140, for each individual that exited the store, a shopping time for the individual is determined. The shopping time may be determined by subtracting the exit time from the entrance time. For example, if an individual entered the store at 11:34 AM on a particular day and exited the store at 12:19 PM on the particular day, then the individual's shopping time is 45 minutes.

At block 150, an average shopping time is calculated based on the shopping times for multiple individuals that entered and exited the store. The average shopping time may be calculated by totaling the shopping times of the multiple individuals and dividing the total by the number of individuals for which a shopping time has been determined.

In an embodiment, the average shopping time excludes shopping times of individuals who did not purchase an item during the day and time that was tracked. Thus, the average shopping time may reflect only shopping times of customers that actually purchased an item from the store while in the store during the tracked duration. In this embodiment, purchasing customers may be identified when such customers, for example, arrive at a checkout counter to purchase one or more items from the store or when such customers leave a self-checkout location designated for customers who do not require assistance from a store employee to purchase the item(s). For example, a camera may be present at a checkout location (if one exists) that captures video or one or more images of the customer that is purchasing (or just purchased) one or more items. As another example, point of sale data may be used to determine shopping times for purchasing customers.

In a related embodiment, an average shopping time is determined for purchasing customers and an average shopping time is determined for non-purchasing customers. A comparison of the two average shopping times may reveal, for example, that customers who make a purchase during the tracked duration tend to spend a significantly less time in the store than customers who did not make a purchase during the tracked duration.

The following is an equation that may be used to calculate the average shopping time of people who spend time in a store:

$$\bar{t} = \frac{\sum_{i=1}^{N}(t_i^* - t_i)}{N}$$

where $t_i^*$ is an exit time of customer i, $t_i$ is an entrance time of customer i, and N is the number of customers who enter the store.

Tracking Entrances and Exits

In an embodiment, instead of tracking individual shopping times, entrance times and exit times are tracked regardless of the individual who enters and exits. Because the average shopping time over all customers is sought, the exit times and entrance times do not need to be paired. The following set of equations illustrate that the above equation is equivalent to determining the difference between the average entrance time and the average exit time for a day measurement:

$$\bar{t} = \frac{\sum_{i=1}^{N}(t_i^* - t_i)}{N}$$
$$= \sum_{i=1}^{N}\left(\frac{t_i^* - t_i}{N}\right)$$
$$= \sum_{i=1}^{N}\left(\frac{t_i^*}{N} - \frac{t_i}{N}\right)$$
$$= \sum_{i=1}^{N}\frac{t_i^*}{N} - \sum_{i=1}^{N}\frac{t_i}{N}$$
$$= \frac{\sum_{i=1}^{N}t_i^*}{N} - \frac{\sum_{i=1}^{N}t_i}{N}$$

where the last two terms are the average exit time and the average entrance time. Thus, the average shopping time may be found by finding the difference between the average exit time and the average entrance time.

Figure 2:
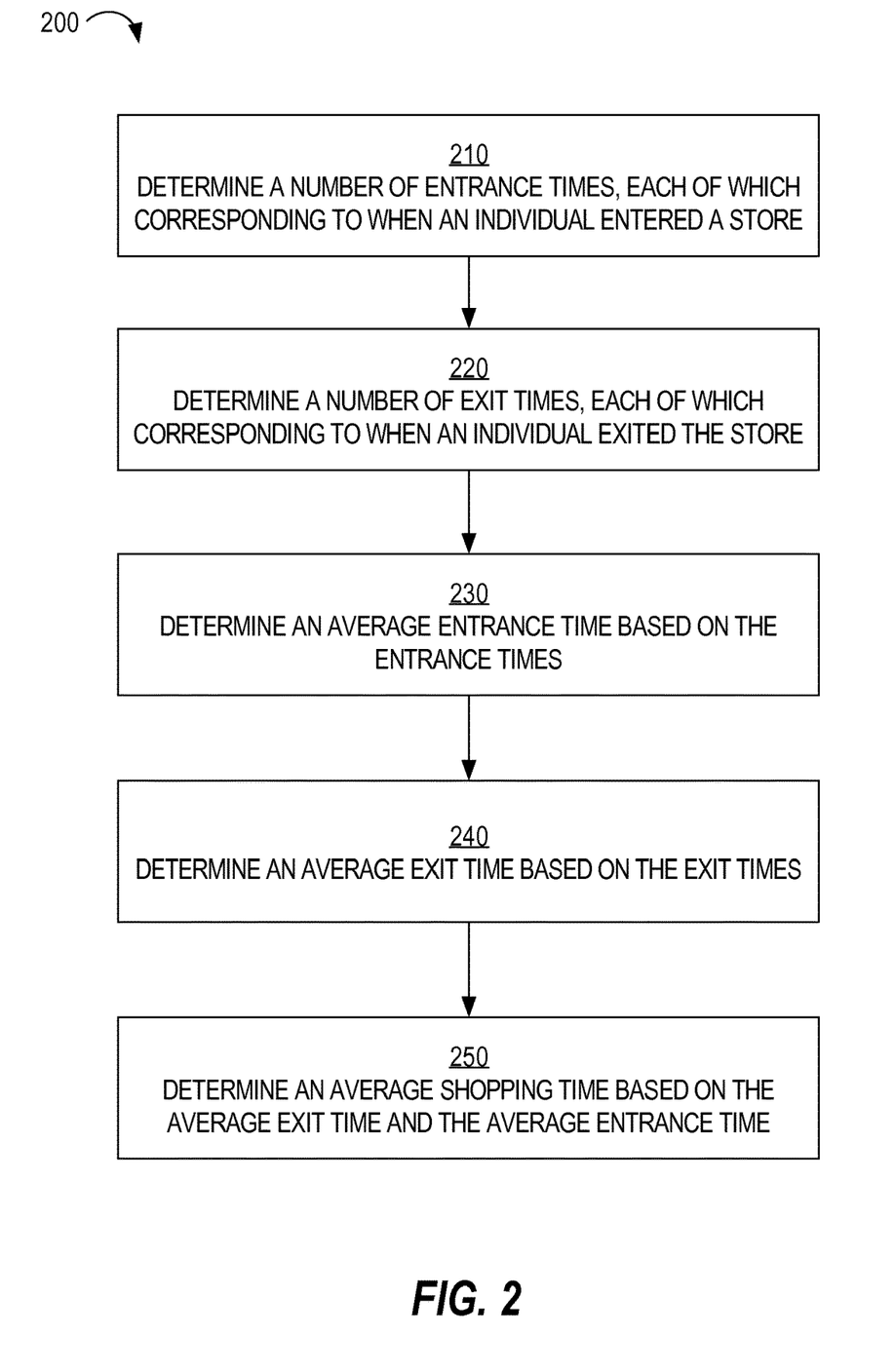
FIG. 2 is a flow diagram that depicts a second process for calculating an average shopping time, in an embodiment.

FIG. 2 is a flow diagram that depicts a process 200 for calculating an average duration time, in an embodiment.

At block 210, a number of entrance times is determined. As noted previously, an entrance time may be determined automatically by one or more video cameras that are directed to one or more entrances and generating video, which is analyzed by a video analyzer to detect instances of when objects enter a certain geographical area, such as individuals entering a store. Alternatively, an entrance time may be determined when an object crosses a "virtual fence". The virtual fence may include one or more lasers that, when interfered by an object crossing the "fence", send a signal that indicates an entrance of an object. A timestamp is determined for each signal that the virtual fence system generates. Alternatively, an entrance time may be determined when an individual removes a card from a card dispenser (similar to when a car driver takes a card from a card machine at a parking garage) or when an individual swipes a card (in the individual's possession before approaching the store) over a card reader.

At block 220, a number of exit times is determined. The exit times may be determined in the same (or similar) way the entrance times are determined. For example, if a card was issued to an individual upon entrance into the store, then the individual may swipe the card at a card reader upon exit or a transmitter in the card may send a signal to a receiver when the individual exits with the card. As another example, video data may be automatically analyzed to determine that an object (e.g., regardless of identity) exits the specified geographical location (e.g., store).

In an embodiment, a comparison is made between the number of exit times and the number of entrance times. If there is a difference, then one or more of the times may be excluded. For example, if there are three more entrance times than exit times, then three entrance times are excluded. The three entrance times may be selected randomly or may be selected based on when the entrance times are, such as the last three entrance times of the day.

In an alternative embodiment, exit times or entrance times are not excluded, even if there is a difference in their respective numbers. The average entrance time and/or average exit time is still valid if reasonable assumptions are made about the error distribution.

At block 230, an average entrance time is determined. The average entrance time may be determined by adding the entrance times (determined in block 210) to generate a total entrance time and then dividing the total entrance time by the number of entrance times. While FIG. 2 depicts block 230 as occurring subsequent to block 220, block 230 may be determined prior to block 220 or while block 220 is being performed. For example, the average entrance time may be continually updated as objects (e.g. people) enter the geographical area (e.g., store).

At block 240, an average exit time is determined. The average exit time may be determined by adding the exit times (determined in block 220) to generate a total exit time and then dividing the total exit time by the number of exit times. Block 240 may be determined continually as individuals are exiting the store. Alternatively, block 240 (and/or block 230) may be performed after the store has closed on that particular day.

At block 250, an average shopping time is determined based on the average exit time and the average entrance time. For example, the average entrance time may be subtracted from the average exit time. If the average entrance time is 12:14 and the average exit time is 12:54, then the average shopping time (or duration) is 40 minutes.

In an embodiment, instead of tracking exits, payments (such as credit card or debit card payments) at checkout are used to represent when people are finished shopping. In this way, physical exits from a store do not need to be tracked.

As noted previously, some stores use different doors for employees to enter and exit. In such circumstances, employee entrances and exits are not considered a problem that needs to be addressed. Additionally, when employees are working during their respective working hours, they generally do not leave. Thus, the average entrance and exit times will not be significantly affected.

Division of Process, Timestamp Format, and Timestamp Granularity

In an embodiment, the party or entity that determines the timestamps is different than the party or entity that determines an average shopping time based on the timestamps. For example, a computing device owned or managed by a store may report timestamp data (reflecting multiple timestamps) to a third party that is tasked with calculating the average shopping time and, optionally, using the average shopping time to perform one or more other calculations. The store's computing device may report the timestamp data in one of many different types of formats.

In one example format, the timestamp data may be a list of entrance times and a list exit times, where each entrance time is associated with a unique entrance and each exit time is associated with a unique exit.

In another example format, the timestamp data may be a list of entrance times and a list of exit times where each entrance time is associated with a count that indicates a number of individuals that entered at or around the entrance time and where each exit time is associated with a count that indicates a number of individuals that exited at or around the exit time. For example, the list of entrance times may include 10:05, 10:10, and 10:20. Time 10:05 may be associated with a count of four, time 10:10 may be associated with a count of one, and time 10:20 may be associated with a count of seven. These counts indicate that four people entered the store between 10:00 and 10:05, that one person entered the store between 10:05 and 10:10, that no one entered the store between 10:10 and 10:15, and that seven people entered the store between 10:15 and 10:20.

In another example, the data may be in the form of time stamps associated with an estimate of the number of people entering or exiting the store. For example, if two people enter at 10:13:45, then the data shows the time stamp and the number of people entering the store as '2'.

If timestamp data includes counts, then, when calculating an average shopping time using the timestamp data, the different entrance times and exit times may be weighted based on their respective counts. Thus, an entrance time that is associated with a count of ten may be weighted twice as much as an entrance time that is associated with a count of five.

In the above example, the granularity of the times is every five minutes. The granularity of the timestamp data may vary from implementation to implementation. Each timestamp may be at the granularity of milliseconds, seconds, minutes, five minutes (as the above example), or some other time range.

Exclusions

In an embodiment, timestamps of one or more individuals may be excluded when calculating the average shopping time at a store. An example of such an individual is anyone shorter than a certain height, such as under 50 inches. Such individuals may be presumed to be children that are not at the store to shop for themselves or others. Small children may be detected in ways other than determining their height, such as detecting that an individual is sitting in a stroller or shopping cart. Anyone sitting in a stroller or shopping cart is presumed to be a child.

Detecting that an individual's timestamps should be excluded may be performed manually or automatically by, for example, analyzing video. For example, a software video application analyzes video data that is captured of a store's entrance may determine that an individual is sitting in a stroller or than an individual is shorter than 50 inches. Accordingly, a timestamp is not generated for that individual.

In an embodiment, for stores with multiple entrances, where customers may only be passing through the store, such as an anchor store at a mall, entry/exit counts for customers who simply walk straight through the store without intending to shop are excluded.

Average Time for Durations that are Less than the Time that People are Allowed to Enter a Location As noted previously, average shopping time (AST) may be calculated for time periods that are less than the period of time that a store is open. For example, an AST may be determined for each two hours (e.g., 8 AM-10 AM, 10 AM-12 PM, 12 PM-2 PM, 2 PM-4 PM, and 4 PM-6 PM). In this way, more granule ASTs are determined for a particular store and can be used to determine how long people are shopping during those time intervals. The resulting ASTs for a single day (or compared across multiple days) may reveal that people are shopping longer in the morning hours than in the afternoon hours In some cases, when determining an average shopping time (AST), those who enter a store are not the same as those who exit the store. For example, an AST may be determined for 10 AM-1 PM on a particular day when a store is open from 8 AM to 10 PM. Thus, some people may have entered the store before 10 AM and exited the store between 10 AM and 1 PM. Similarly, other people may have entered the store between 10 AM and 1 PM and exited the store after 1 PM. For example, if a large number of people enter at 12:55 PM and do not leave until after 1 PM, then the average exit time may be skewed toward the 1 PM time and the average staying duration for 10 AM and 1 PM may be longer than in actuality.

To adjust for this skewing, one or more approaches may be implemented. One approach involves removing (or not considering) certain exit times and/or entrance times. For example, any entrances between 12:45 PM and 1 PM are not included when determining the average entrance time. As another example, any exits between 10 AM and 10:25 AM are not included when determining the average exit time.

Another approach involves determining a difference in the number of entrances and the number of exits. If the number of entrances is greater than the number of exits, then one or more entrance times may be excluded from determining the average entrance time. The number of entrance times to exclude may be equal to the difference between the number of entrances and the number of exits. The specific entrance times to exclude may be entrances that occurred closest to the end of the tracked duration (e.g., 1 PM in the above example).

Comparing Average Shopping Times Over Time

In an embodiment, average shopping times (ASTs) are determined for multiple days. The different ASTs may then be compared to each other. For example, an AST for one Monday is compared with an AST for another Monday. One reason such a comparison may be performed is because the store may have changed the layout between the two Mondays and a manager/owner of the store desires to see if the average shopping duration has increased or decreased as a result of the layout.

In an embodiment, ASTs for multiple time durations (e.g., hours or days) may be aggregated. For example, an AST may be determined for each day of March in a particular year. Then an AST for March may be determined by adding the AST for each day of March and dividing the total by the number of shopping days in March. Additionally or alternatively, a median shopping time (MST) may be determined for March. As another example, an AST (or MST) may be determined for each Thursday of a summer month in a particular year. A single AST for summer Thursdays may then be determined, along with a standard deviation.

Comparing Average Shopping Times Across Different Locations

In an embodiment, average shopping times (ASTs) are determined for different locations. For example, one AST for one store location (e.g., in one California city) is determined and another AST for another store location (e.g., in a neighboring California city) is determined. The two ASTs may be for the same day or for different days. The two ASTs may be compared to reveal that the AST for one store location is significantly different than the AST for the other store location.

As another example, an AST (or MST) may be determined for a month (e.g., based on individual day ASTs) for one store that sells high end clothing and another AST may be determined for another store that sells low end clothing and that has the same or similar layout as the first store. The two stores may be relatively close to each other (e.g., in the same or neighboring city) or may be relatively far from each other (e.g., in different counties, states, or countries). The two ASTs may be compared to determine which store has a higher AST.

Specific Areas

The techniques described herein may be used to track average shopping time spent in a specific area within a store. For example, a store owner may desire to know how long people are looking at or are near the shoe display, at least on average. The store owner may regard a relatively high average (or median) time spent near the shoe display as a success of the shoe display in attracting attention.

As another example, a specific area within a store may be a cosmetics section, within a store, that has a history of customers complaining about the long wait times. A store owner may add employees and/or change the layout of the cosmetics section to assist in reducing shopping times of future customers. An average shopping time (AST) may be calculated for the cosmetics section to determine whether the AST for the cosmetics section has decreased as a result of the added employees and/or the changed layout.

As noted previously, many techniques may be used to determine the entrances to and the exits from a specific area within a store. For example, one or more cameras may be pointed at the specific area such that whenever an individual comes into view of the camera(s), then an entrance timestamp for that individual is determined and stored. Similarly, if an individual leaves the view of the camera(s), then an exit timestamp is determined and stored.

Non-Shopping Contexts

As noted previously, while the examples above are in the context of shopping, embodiments are not limited to the shopping context. Techniques described herein may be applied to any person, animal, or inanimate object that is located within a geographical area for a particular amount of time. For example, an average "looking" time may be calculated for a particular painting at a museum where, for example, administrators of the museum desire to know (a)

the average time people spend in an art exhibit consisting of work of a particular artist or (b) the average time people spend within a small geographical area around a particular work of art. It is presumed that if a person is within the small geographical area, then the person is there to admire or at least look at the work of art.

As another example, a zoo may want to determine how long a certain bird species spends in a particular area of a cage. Knowing the average staying duration of each bird in that area may provide a clue as to the daily habits of the bird species.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
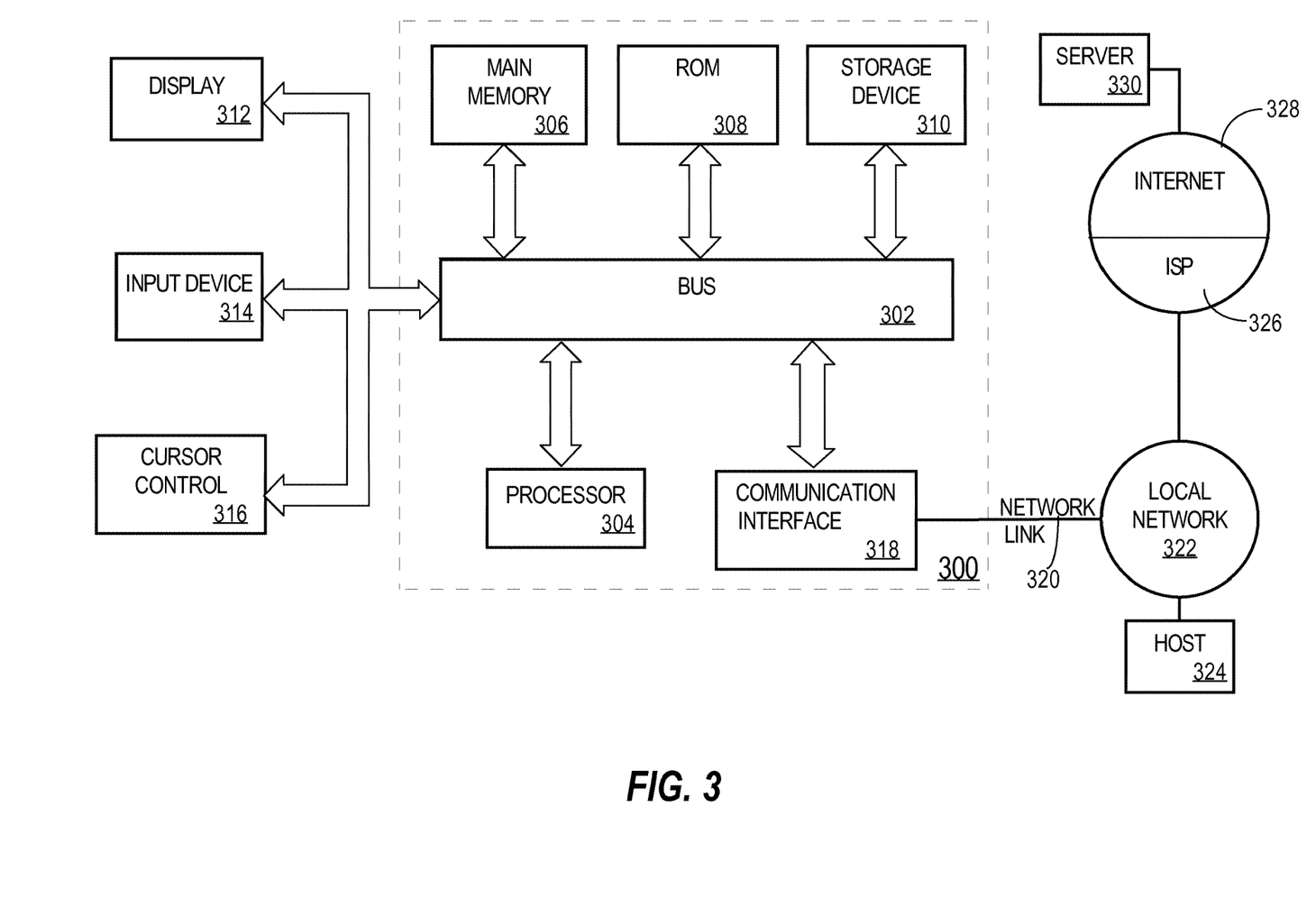
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for determining an average time objects spend at a particular location without tracking staying duration for individual objects, the method comprising:

during a monitoring period, recording first video data using a first video camera associated with the particular location, and recording second video data using a second video camera associated with the particular location;

a video analyzer executing on one or more first computing devices automatically analyzing one or more images in the first video data to identify a first plurality of objects depicted in the one or more images in the first video data that entered the particular location and a plurality of entrance times, wherein each entrance time of the plurality of entrance times corresponds to when one or more objects of the first plurality of objects entered the particular location;

the video analyzer analyzing one or more images in the second video data to identify a second plurality of objects depicted in the one or more images in the second video that exited the particular location and a plurality of exit times, wherein each exit time of the plurality of exit times corresponds to when one or more objects of the second plurality of objects exited the particular location;

after identifying the plurality of entrance times and the plurality of exit times, one or more second computing devices automatically comparing a number of entrance times for the particular location during the monitoring period and a number of exit times for the particular location during the monitoring period;

in response to determining that the number of entrance times is greater than the number of exit times, the one or more second computing devices removing one or more entrance times;

the one or more second computing devices determining an average entrance time based on the plurality of entrance times not including the one or more entrance times;

the one or more second computing devices determining an average exit time based on the plurality of exit times;

the one or more second computing devices determining the average time objects spend at the particular location based on a difference between the average exit time and the average entrance time.

2. The method of claim 1, wherein:
the average entrance time is based on an entrance time for a particular object;
the average exit time is not based on an exit time for the particular object.

3. The method of claim 1, wherein:
the average entrance time is not based on an entrance time for a particular object;
the average exit time is based on an exit time for the particular object.

4. The method of claim 1, wherein:
each of the plurality of entrance times is on a particular day;
each of the plurality of exit times is on the particular day.

5. The method of claim 4, wherein the average time is a first average time, the method further comprising:
the video analyzer analyzing one or more images in the first video data to identify a second plurality of entrance times, wherein each entrance time of the second plurality of entrance times corresponds to when one or more objects depicted in the one or more images in the first video data entered the particular location on a second day that is different than the particular day;
the video analyzer analyzing one or more images in the second video data to identify a second plurality of exit times, wherein each exit time of the second plurality of exit times corresponds to when one or more objects depicted in the one or more images in the second video data exited the particular location on the second day;
the one or more second computing devices determining a second average entrance time based on the second plurality of entrance times;
the one or more second computing devices determining a second average exit time based on the second plurality of exit times;
the one or more second computing devices determining a second average time objects spend at the particular location on the second day based on a difference between the second average exit time and the second average entrance time;
the one or more second computing devices comparing the second average time to the first average time.

6. The method of claim 4, wherein the average time is a first average time, wherein the particular location is a first particular location, the method further comprising:
during the monitoring period, recording third video data using a third video camera associated with a second particular location that is different than the first particular location, and recording fourth video data using a fourth video camera associated with the second particular location;

the video analyzer analyzing one or more images in the third video data to identify a second plurality of entrance times, wherein each entrance time of the second plurality of entrance times corresponds to when one or more objects depicted in the one or more images in the third video data entered the second particular location;

the video analyzer analyzing one or more images in the fourth video data to identify a second plurality of exit times, wherein each exit time of the second plurality of exit times corresponds to when one or more objects depicted in the one or more images in the fourth video data exited the second particular location;

the one or more second computing devices determining a second average entrance time based on the second plurality of entrance times;

the one or more second computing devices determining a second average exit time based on the second plurality of exit times;

the one or more second computing devices determining a second average time that people spend at the second particular location based on a difference between the second average exit time and the second average entrance time;

the one or more second computing devices comparing the second average time to the first average time.

7. The method of claim 6, wherein:
each of the second plurality of entrance times is on the particular day;
each of the second plurality of exit times is on the particular day.

8. The method of claim 4, wherein:
each of the plurality of entrance times is during a first time range on the particular day;
each of second plurality of exit times is during the first time range on the particular day;
the first time range is less than the total hours that people are allowed to enter the particular location on the particular day.

9. The method of claim 8, wherein a second time range is different than the first time range, further comprising:
the video analyzer analyzing one or more images in the first video data to identify a second plurality of entrance times, wherein each entrance time of the second plurality of entrance times corresponds to when one or more objects depicted in the one or more images in the first video data entered the particular location during the second time range on the particular day;
the video analyzer analyzing one or more images in the second video data to identify a second plurality of exit times, wherein each exit time of the second plurality of exit times corresponds to when one or more objects depicted in the one or more images in the second video data exited the particular location during the second time range;
the one or more second computing devices determining a second average entrance time based on the second plurality of entrance times;
the one or more second computing devices determining a second average exit time based on the second plurality of exit times;
the one or more second computing devices determining a second average time that objects spend at the particular location during the second time range based on a difference between the second average exit time and the second average entrance time.

10. The method of claim 1, wherein the one or more second computing devices are associated with a first party that is different than a second party associated with the first video camera and the second video camera.

11. One or more non-transitory storage media carrying instructions for determining an average time people spend at a particular location without tracking staying duration for individual objects, wherein the instructions, when executed by one or more processors, cause:

during a monitoring period, recording first video data using a first video camera associated with the particular location, and recording second video data using a second video camera associated with the particular location;

a video analyzer executing on one or more first computing devices automatically analyzing one or more images in the first video data to identify a first plurality of objects depicted in the one or more images in the first video data that entered the particular location and a plurality of entrance times, wherein each entrance time of the plurality of entrance times corresponds to when one or more objects of the first plurality of objects entered the particular location;

the video analyzer analyzing one or more images in the second video data to identify a second plurality of objects depicted in the one or more images in the second video data that exited the particular location and a plurality of exit times, wherein each exit time of the plurality of exit times corresponds to when one or more objects of the second plurality of objects exited the particular location;

after identifying the plurality of entrance times and the plurality of exit times, one or more second computing devices automatically comparing a number of entrance times for the particular location during the monitoring period and a number of exit times for the particular location during the monitoring period;

in response to determining that the number of entrance times is greater than the number of exit times, the one or more second computing devices removing one or more entrance times;

the one or more second computing devices determining an average entrance time based on the plurality of entrance times not including the one or more entrance times;

the one or more second computing devices determining an average exit time based on the plurality of exit times;

the one or more second computing devices determining the average time objects spend at the particular location based on a difference between the average exit time and the average entrance time.

12. The one or more non-transitory storage media of claim 11, wherein:
the average entrance time is based on an entrance time for a particular object;
the average exit time is not based on an exit time for the particular object.

13. The one or more non-transitory storage media of claim 11, wherein:
the average entrance time is not based on an entrance time for a particular object;
the average exit time is not based on an exit time for the particular object.

14. The one or more non-transitory storage media of claim 11, wherein:

each of the plurality of entrance times is on a particular day;
each of the plurality of exit times is on the particular day.

15. The one or more non-transitory storage media of claim 14, wherein the average time is a first average time, wherein the instructions, when executed by the one or more processors, further cause:
the video analyzer analyzing one or more images in the first video data to identify a second plurality of entrance times, wherein each entrance time of the second plurality of entrance times corresponds to when one or more objects depicted in the one or more images in the first video data entered the particular location on a second day that is different than the particular day;
the video analyzer analyzing one or more images in the second video data to identify a second plurality of exit times, wherein each exit time of the second plurality of exit times corresponds to when one or more objects depicted in the one or more images in the second video data exited the particular location on the second day;
the one or more second computing devices determining a second average entrance time based on the second plurality of entrance times;
the one or more second computing devices determining a second average exit time based on the second plurality of exit times;
the one or more second computing devices determining a second average time objects spend at the particular location on the second day based on a difference between the second average exit time and the second average entrance time;
the one or more second computing devices comparing the second average time to the first average time.

16. The one or more non-transitory storage media of claim 14, wherein the average time is a first average time, wherein the particular location is a first particular location, wherein the instructions, when executed by the one or more processors, further cause:
during the monitoring period, recording third video data using a third video camera associated with a second particular location that is different than the first particular location, and recording fourth video data using a fourth video camera associated with the second particular location;
the video analyzer analyzing one or more images in the third video data to identify a second plurality of entrance times, wherein each entrance time of the second plurality of entrance times corresponds to when one or more objects depicted in the one or more images in the third video data entered the second particular location;
the video analyzer analyzing one or more images in the fourth video data to identify a second plurality of exit times, wherein each exit time of the second plurality of exit times corresponds to when one or more objects depicted in the one or more images in the fourth video data exited the second particular location;
the one or more second computing devices determining a second average entrance time based on the second plurality of entrance times;
the one or more second computing devices determining a second average exit time based on the second plurality of exit times;
the one or more second computing devices determining a second average time that objects spend at the second particular location based on a difference between the second average exit time and the second average entrance time;
the one or more second computing devices comparing the second average time to the first average time.

17. The one or more non-transitory storage media of claim 16, wherein:
each of the second plurality of entrance times is on the particular day;
each of the second plurality of exit times is on the particular day.

18. The one or more non-transitory storage media of claim 14, wherein:
each of the plurality of entrance times is during a first time range on the particular day;
each of second plurality of exit times is during the first time range on the particular day;
the first time range is less than the total hours that people are allowed to enter the particular location on the particular day.

19. The one or more non-transitory storage media of claim 18, wherein a second time range is different than the first time range, wherein the instructions, when executed by the one or more processors, further cause:
the video analyzer analyzing one or more images in the first video data to identify a second plurality of entrance times, wherein each entrance time of the second plurality of entrance times corresponds to when one or more objects depicted in the one or more images in the first video data entered the particular location during the second time range on the particular day;
the video analyzer analyzing one or more images in the second video data to identify a second plurality of exit times, wherein each exit time of the second plurality of exit times corresponds to when one or more objects depicted in the one or more images in the second video data exited the particular location during the second time range;
determining a second average entrance time based on the second plurality of entrance times;
determining a second average exit time based on the second plurality of exit times;
determining a second average time that objects spend at the particular location during the second time range based on a difference between the second average exit time and the second average entrance time.

20. The one or more non-transitory storage media of claim 11, wherein the one or more second computing devices are associated with a first party that is different than a second party associated with the first video camera and the second video camera.

21. The method of claim 1 further comprising:
the video analyzer using facial recognition to identify one or more employees depicted in the one or more images in the first video data that entered the particular location, and wherein identifying the one or more objects that entered the particular location comprises excluding the one or more employees that entered the particular location;
the video analyzer using facial recognition to identify one or more employees depicted in the one or more images in the second video data that exited the particular location, and wherein identifying the one or more objects that exited the particular location comprises excluding the one or more employees that exited the particular location.

22. The one or more non-transitory storage media of claim 11, wherein the instructions, when executed by the one or more processors, further cause:
- the video analyzer using facial recognition to identify one or more employees depicted in the one or more images in the first video data that entered the particular location, and wherein identifying the one or more objects that entered the particular location comprises excluding the one or more employees that entered the particular location;
- the video analyzer using facial recognition to identify one or more employees depicted in the one or more images in the second video data that exited the particular location, and wherein identifying the one or more objects that exited the particular location comprises excluding the one or more employees that exited the particular location.

* * * * *